US012208989B2

(12) United States Patent
Zhu

(10) Patent No.: US 12,208,989 B2
(45) Date of Patent: Jan. 28, 2025

(54) EMBEDDED TYPE UPDATING ESCALATOR

(71) Applicant: HANSON LIFT (SUZHOU) CO., LTD., Jiangsu (CN)

(72) Inventor: Xueming Zhu, Jiangsu (CN)

(73) Assignee: HANSON LIFT (SUZHOU) CO., LTD.

( * ) Notice: Subject to any disclaimer, the term of this patent is extended or adjusted under 35 U.S.C. 154(b) by 120 days.

(21) Appl. No.: 18/009,226

(22) PCT Filed: Jul. 13, 2020

(86) PCT No.: PCT/CN2020/101572
§ 371 (c)(1),
(2) Date: Dec. 8, 2022

(87) PCT Pub. No.: WO2021/258435
PCT Pub. Date: Dec. 30, 2021

(65) Prior Publication Data
US 2023/0211982 A1 Jul. 6, 2023

(30) Foreign Application Priority Data

Jun. 22, 2020 (CN) .......................... 202010573002.5

(51) Int. Cl.
*B66B 21/04* (2006.01)
*B66B 23/00* (2006.01)
(52) U.S. Cl.
CPC .............. *B66B 21/04* (2013.01); *B66B 23/00* (2013.01)
(58) Field of Classification Search
CPC ................................ B66B 21/04; B66B 23/00
(Continued)

(56) References Cited

U.S. PATENT DOCUMENTS 6,685,002 B1 * 2/2004 Nurnberg ................ B66B 23/00
198/321
8,950,568 B2 * 2/2015 Casielles Estrada ........................
B66B 23/147
198/584
(Continued)

FOREIGN PATENT DOCUMENTS

CN 103010912 A 4/2013
CN 106276558 A 1/2017
(Continued)

OTHER PUBLICATIONS

US 2008/0164117 A1, Drahohs et al., Jul. 10, 2008.*
(Continued)

*Primary Examiner* — Douglas A Hess
(74) *Attorney, Agent, or Firm* — The Belles Group, P.C.

(57) ABSTRACT

An embedded type updating escalator, combined with an original truss of an original escalator for installation. The embedded type updating escalator includes a truss assembly, as well as stairs, stair guide rails, stair chains, a traction machine, a skirt panel, inner and outer cover plates, a handrail system, and an electrical control system which are combined and mounted with the truss assembly. The truss assembly includes multiple sections. The transverse width of the sections is smaller than the inner transverse width of the original truss, and the multiple sections are embedded into the original truss. The original truss is provided with multiple transverse bars, and the sections avoid the transverse bars when embedded into the original truss.

8 Claims, 4 Drawing Sheets

(58) Field of Classification Search
USPC .................................................. 198/321, 326
See application file for complete search history.

(56) References Cited

U.S. PATENT DOCUMENTS

| | | | |
|---|---|---|---|
| 10,562,741 B2* | 2/2020 | Eder | .................. B66B 23/14 |
| 11,472,673 B2* | 10/2022 | Eder | .................. B66B 23/00 |
| 11,572,257 B2* | 2/2023 | Salojärvi | ............... B66B 23/00 |
| 11,977,364 B2* | 5/2024 | Zimmermann | ......... G06T 17/00 |
| 2007/0129831 A1 | 6/2007 | Encinas et al. | |
| 2019/0322492 A1 | 10/2019 | Eder et al. | |

FOREIGN PATENT DOCUMENTS

| | | | | |
|---|---|---|---|---|
| EP | 2527283 A1 * | 11/2012 | ............ | B66B 21/00 |
| EP | 3109196 A1 | 12/2016 | | |
| JP | 2006008390 A | 1/2006 | | |
| JP | 2006036482 A | 2/2006 | | |
| JP | 2009184771 A | 8/2009 | | |
| JP | 4836706 B2 | 12/2011 | | |
| JP | 2012180203 A | 9/2012 | | |
| JP | 2013067461 A | 4/2013 | | |
| JP | 6123511 B2 | 5/2017 | | |
| RU | 2430873 C2 | 10/2011 | | |
| RU | 2018144791 A | 6/2020 | | |
| WO | WO-2017220650 A1 * | 12/2017 | ........... | B66B 19/007 |

OTHER PUBLICATIONS

Office Action issued in counterpart Russian Application 2023100626 on Jun. 21, 2023.
Office Action issued in counterpart Japanese Application 2022-577197 on Jan. 9, 2024.

* cited by examiner

EMBEDDED TYPE UPDATING ESCALATOR

This application is the national phase of International Patent Application No. PCT/CN2020/101572, titled "EMBEDDED TYPE UPDATING ESCALATOR", filed on Jul. 13, 2020, which claims the benefit of the priority to Chinese Patent Application No. 202010573002.5, titled "EMBEDDED TYPE UPDATING ESCALATOR", filed with the China National Intellectual Property Administration on Jun. 22, 2020, both of which are incorporated herein by reference.

FIELD

The present application relates to the technical field of escalators, and in particular to an embedded type updating escalator.

BACKGROUND

An escalator is a stationary electric drive device with stairs circulating upward or downward to transport passengers. The escalator can continuously transport passengers and has high transportation capacity, and is therefore widely used in public places with large traffic such as a shopping mall or a station.

The escalator is composed of a truss, stairs, stair guide rails, stair chains, a tractor, skirt plates, inner and outer cover plates, a handrail system, and an electrical control system. The truss is the basic bearing and supporting component of the escalator, and other components of the escalator are born by the truss. The truss is also the largest and heaviest of the components of the escalator. As shown in FIG. 1, the original truss 10 of the escalator is mounted on a building 1, and the original truss 10 may be partially embedded into the building 1 if necessary. The existing escalator is generally designed together with the building and is adaptively mounted to the building. The escalator can be repaired by replacing some components when it is damaged. However, when the overall escalator needs to be updated, it is difficult to do so by replacing the components one by one, and the original escalator has to be completely removed, so does the old truss, and then the new escalator can be mounted, which is time-consuming and labor-intensive. During the removal, the old truss needs to be removed, which may inevitably cause damage to the building and thus further increase the cost of update.

To sum up, there is a need in the art for an escalator that can be updated and upgraded without removing the original truss, so as to save cost and manpower.

SUMMARY

In view of this, an object according to the present application is to provide an embedded type updating escalator which adopts a sectioned truss assembly, where the sections of the truss assembly are embedded into the original truss, and other components of the escalator are mounted in combination with the truss assembly, so as to realize the update of the escalator without removing the original truss.

In order to achieve the above object, an embedded type updating escalator is provided according to the present application, which is mounted in combination with an original truss of an original escalator. The embedded type updating escalator includes a truss assembly, as well as stairs, stair guide rails, stair chains, a traction machine, skirt plates, inner and outer cover plates, a handrail system, and an electrical control system which are mounted in combination with the truss assembly; where the truss assembly includes multiple sections, a transverse width of each section is smaller than an inner transverse width of the original truss, and the multiple sections are embedded into the original truss; the original truss is provided with multiple transverse bar members, and the sections are embedded into the original truss to avoid the transverse bar members.

Preferably, the original truss includes a lower portion, a middle portion and an upper portion, where the lower portion and the upper portion are parallel and horizontal, the middle portion is obliquely located between the lower portion and the upper portion, a bent turning section is provided at the junction between the middle portion and the lower portion, and another bent turning section is provided at the junction between the middle portion and the upper portion.

Preferably, the multiple sections include a lower machine room, a lower turning section, multiple middle sections, an upper turning section and an upper machine room, where the lower machine room is embedded into the lower portion, the lower turning section is embedded into the bent turning section at the junction between the lower portion and the middle portion, the multiple middle sections are embedded into the middle portion, the upper turning section is embedded into the bent turning section at the junction between the middle portion and the upper portion, and the upper machine room is embedded into the upper portion.

Preferably, each section includes two upper chord members and two lower chord members, where the upper and lower chord members each have an angle steel structure, the two upper chord members are fixed to two sides of an upper portion of the corresponding section respectively, the two lower chord members are fixed to two sides of a lower portion of the corresponding section respectively; a transverse edge of each upper chord member extends away from the corresponding section, and a transverse edge of each lower chord member extends toward an interior of the corresponding section.

Preferably, each section includes two side plates which are located on two sides of the corresponding section respectively, where each side plate is bent to form an upper transverse edge and a lower transverse edge, the upper transverse edge extends away from the corresponding section, and the lower transverse edge extends toward the interior of the corresponding section.

An escalator updating method of use of the embedded type updating escalator is provided according to the present application, which includes:

(A) removing other components of the original escalator except the original truss to reserve a complete structure of the original truss including the transverse bar members;

(B) embedding the multiple sections of the truss assembly into the original truss to avoid the transverse bar members during embedding, and connecting and fixing the truss assembly with the original truss; and (C) mounting the stairs, the stair guide rails, the stair chains, the traction machine, the skirt plates, the inner and outer cover plates, the handrail system, and the electrical control system in combination with the truss assembly.

Compared with the conventional technology, the advantages of the embedded type updating escalator according to the present application are as follows: the update of the escalator can be realized while the original truss is reserved, which effectively reduces the update cost and saves manpower; the embedded type updating escalator can realize the complete update of the escalator while the original truss is reserved, and the transverse bar members of the original truss can be completely reserved, so the structure of the original truss is not structurally damaged, which ensures the strength of the product and the safety of the updating process of the escalator, and the new escalator has complete functions and meets safety standards.

BRIEF DESCRIPTION OF THE DRAWINGS

For more clearly illustrating the technical solutions in the embodiments of the present application or in the conventional technology, drawings referred to for describing the embodiments or the conventional technology will be briefly described hereinafter. Apparently, the drawings in the following description are only several examples of the present application, and for those skilled in the art, other drawings may be obtained based on these drawings without any creative efforts.

DETAILED DESCRIPTION OF THE EMBODIMENTS

Technical solutions in the embodiments of the present application are clearly and completely described hereinafter in conjunction with the drawings in the embodiments of the present application. Apparently, the embodiments described in the following are only some embodiments of the present application, rather than all embodiments. Based on the embodiments in the present application, all of the other embodiments which are obtained by those skilled in the art without any creative work fall within the protection scope of the present application.

Figure 3:
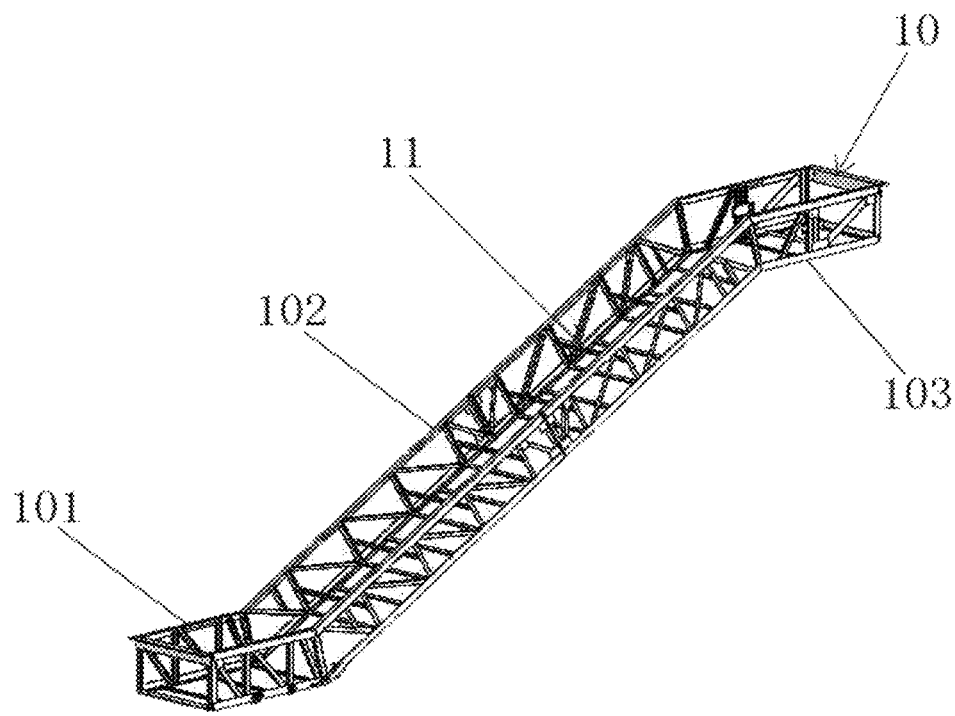
FIG. 3 is a schematic structural view of the original truss after other components of the original escalator are removed.

As shown in FIG. 3, an original truss 10 of an original escalator with other components removed has a lower portion 101, a middle portion 102 and an upper portion 103, where the lower portion 101 and the upper portion 103 are parallel and horizontal, the lower portion 101 and the upper portion 103 are respectively connected to different floors, and the middle portion 102 is obliquely located between the lower portion 101 and the upper portion 103. A bent turning section is provided at the junction between the middle portion 102 and the lower portion 101, and another bent turning section is provided at the junction between the middle portion 102 and the upper portion 103. The middle portion 102 of the original truss 10 has multiple transverse bar members 11 which are distributed in parallel.

Figure 4:
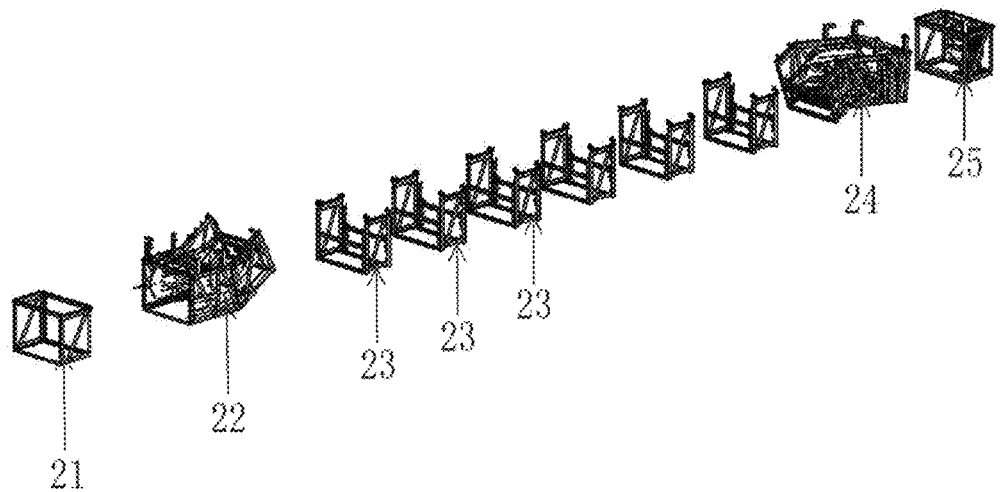
FIG. 4 is a schematic structural view of a truss assembly of an embedded type updating escalator according to the present application.

Referring to FIG. 4, an embedded type updating escalator according to the present application includes a truss assembly, as well as stairs, stair guide rails, stair chains, a traction machine, skirt plates, inner and outer cover plates, a handrail system, and an electrical control system which are mounted in combination with the truss assembly. The truss assembly includes multiple sections, and the multiple sections specifically include a lower machine room 21, a lower turning section 22, multiple middle sections 23, an upper turning section 24 and an upper machine room 25. Widths of the lower machine room 21, the lower turning section 22, the multiple middle sections 23, the upper turning section 24 and the upper machine room 25 are smaller than an inner transverse width of the original truss 10, so that they can be embedded into the original truss 10. The lower machine room 21, the lower turning section 22, the multiple middle sections 23, the upper turning section 24 and the upper machine room 25 are embedded into corresponding positions of the original truss 10 respectively to avoid the transverse bar members 11 at the corresponding positions, and then other components of the embedded type updating escalator are mounted. The embedded type updating escalator can completely maintain the strength of the original truss 10.

Figure 5:
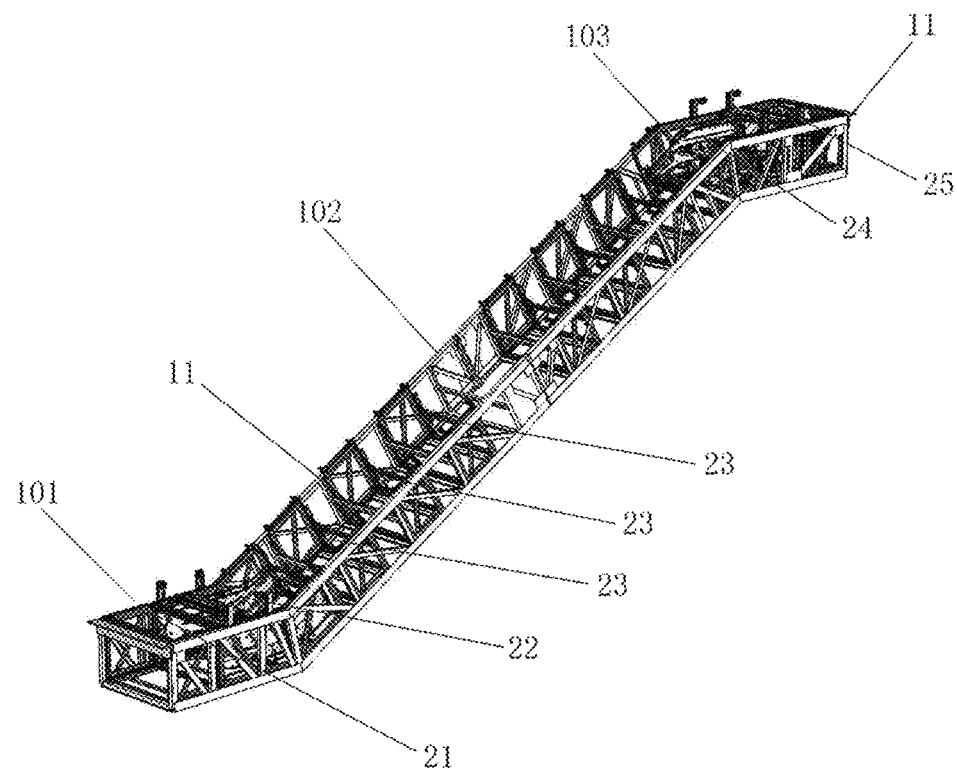
FIG. 5 is a schematic structural view showing that the truss assembly of the embedded type updating escalator according to the present application is embedded into the original truss.

Specifically, as shown in FIG. 5, the lower machine room 21 is embedded into the lower portion 101, the lower turning section 22 is embedded into the junction between the lower portion 101 and the middle portion 102, the multiple middle sections 23 are embedded into the middle portion 102, the upper turning section 24 is embedded into the junction between the middle portion 102 and the upper portion 103, and the upper machine room 25 is embedded into the upper portion 103.

Figure 1:
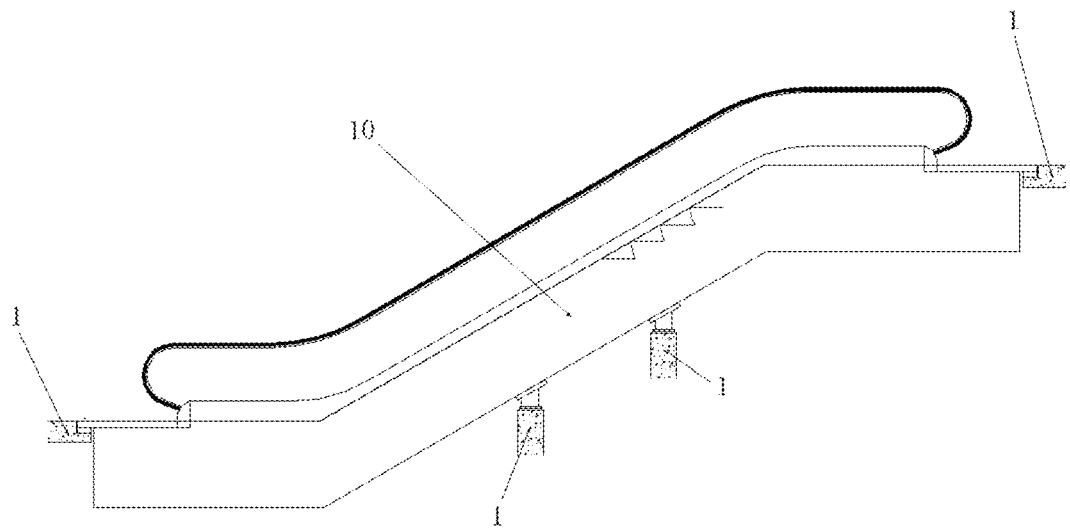
FIG. 1 is a schematic view of a connection between a truss of an escalator and a building in the conventional technology.
Figure 2A:
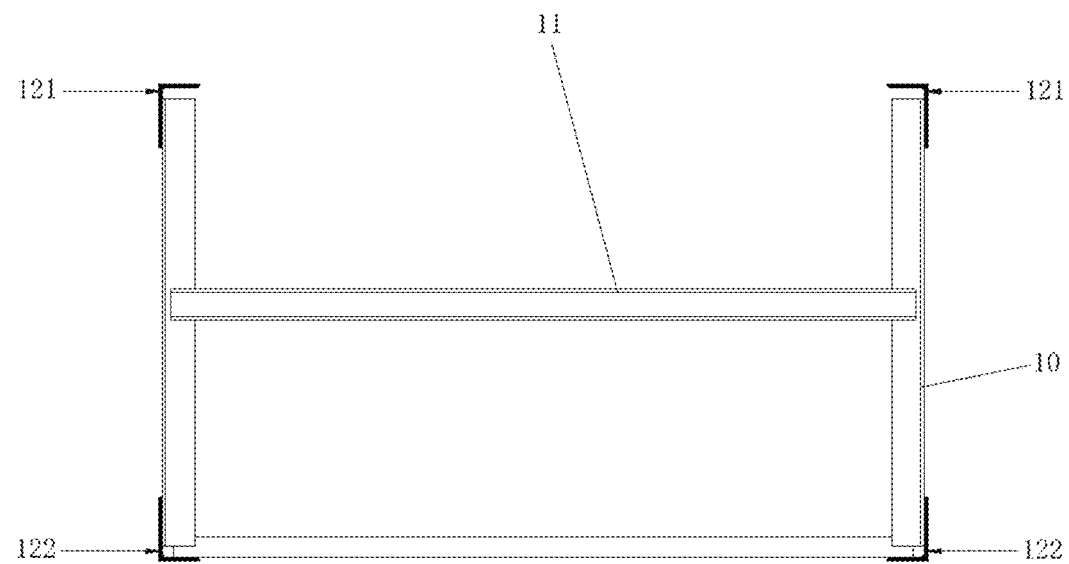
FIG. 2A is a schematic view showing a layout of angle steel chord members of the truss of the escalator in the conventional technology.

As shown in FIG. 2A, the original truss 10 includes two upper chord members 121 and two lower chord members 122, where the upper chord members 121 and the lower chord members 122 each have an angle steel structure, the two upper chord members 121 are welded to two sides of an upper portion of the original truss 10 respectively, the two lower chord members 122 are welded to two sides of a lower portion of the original truss 10 respectively, and transverse edges of the upper chord members 121 and the lower chord members 122 extend toward an interior of the original truss 10.

Figure 2B:
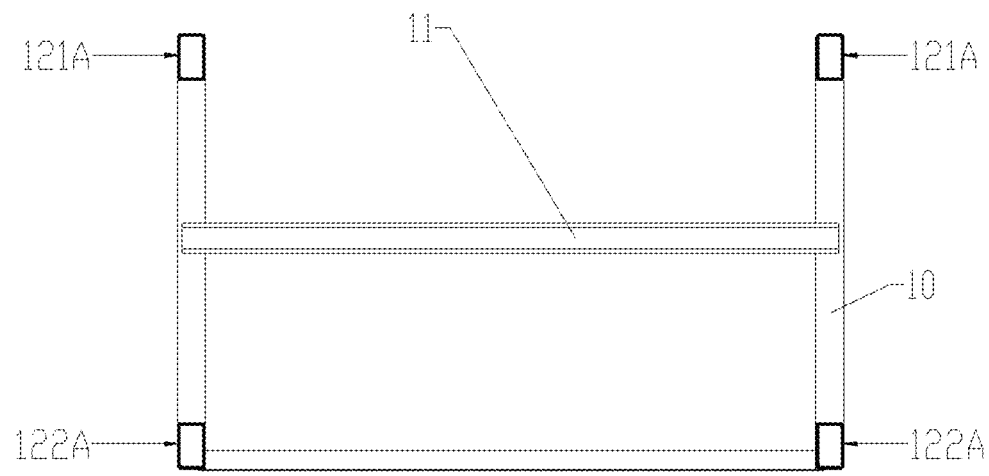
FIG. 2B is a schematic view showing a layout of rectangular tubular chord members of the truss of the escalator in the conventional technology.

As shown in FIG. 2B, the original truss 10 includes two chord members 121A and two lower chord members 122A, where the upper chord members 121A and the lower chord members 122A each have an rectangular tube structure, the two upper chord members 121A are welded to two sides of the upper portion of the original truss 10 respectively, and the two lower chord members 122A are welded to two sides of the lower portion of the original truss 10 respectively.

Figure 6:
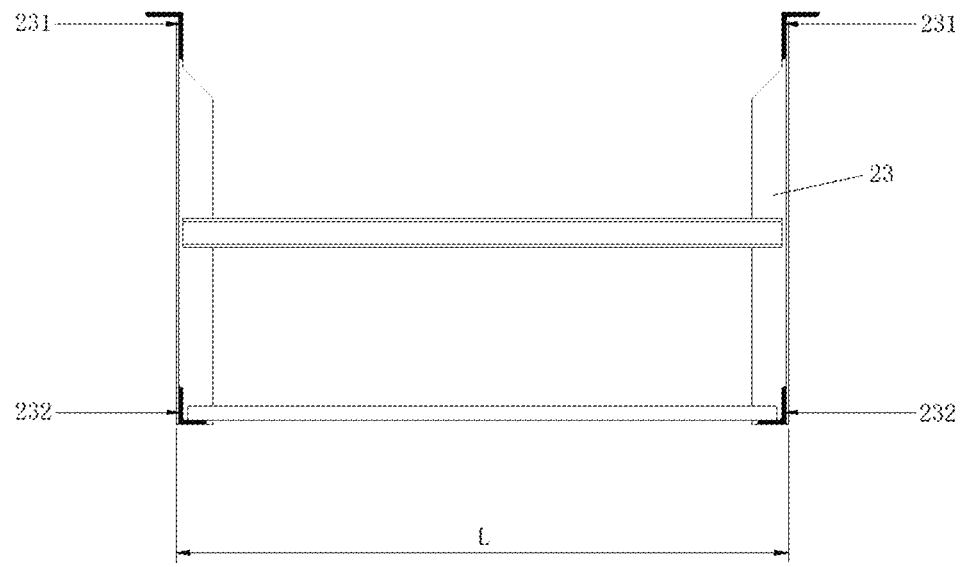
FIG. 6 is a schematic structural view of chord members of the truss assembly of the embedded type updating escalator according to the present application.

In order to embed the sections of the truss assembly into the original truss 10, the chord members of the truss assembly are arranged as shown in FIG. 6. As shown in FIG. 6, the arrangement of the chord members on each middle section 23 is taken as an example for description, the arrangement of the chord members of the lower machine room 21, the lower turning section 22, the upper turning section 24, and the upper machine room 25 is the same as that of each middle section 23. Each middle section 23 includes two upper chord members 231 and two lower chord members 232, where the upper chord members 231 and the lower chord members 232 each have an angle steel structure, the two upper chord members 231 are welded to two sides of an upper portion of the corresponding middle section 23 respectively, and the two lower chord members 232 are welded to two sides of a lower portion of the corresponding middle section 23 respectively. A transverse edge of each upper chord member 231 extends away from the corresponding middle section 23, and a transverse edge of each lower chord member 232 extends toward an interior of the corresponding middle section 23. The arrangement of the chord members of the middle sections 23 is beneficial to reducing the transverse width L of the middle sections 23, so that the middle sections 23 can be easily embedded into the original truss 10. Correspondingly, since the arrangement of the chord members of the lower machine room 21, the lower turning section 22, the upper turning section 24, and the upper machine room 25 is the same as that of each middle section 23, the lower machine room 21, the lower turning section 22, the upper turning section 24, and the upper machine room 25 can be easily embedded into the original truss 10. It is worth noting that the upper chord members 231 and the lower chord members 232 may be made of various materials.

Figure 7:
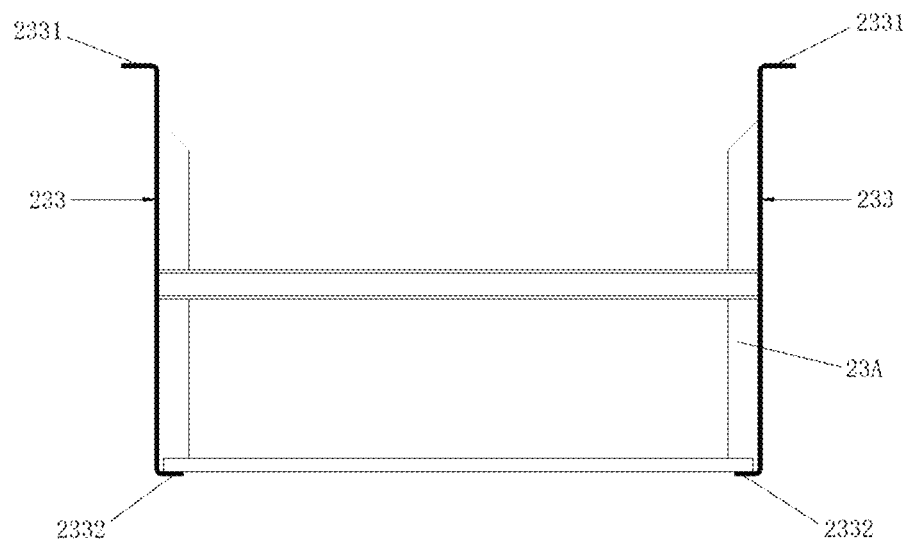
FIG. 7 is a schematic structural view showing a variant of the chord members of the truss assembly of the embedded type updating escalator according to the present application.

As shown in FIG. 7, the structure of bent edges of a side plate can be used by the chord assembly to realize the function of the chord members. Specifically, the middle sections 23A are taken as an example, where each middle section 23A includes two side plates 233 which are located on two sides of the corresponding middle section 23A respectively. Each side plate 233 has an upper transverse edge 2331 and a lower transverse edge 2332 which are formed by bending, the upper transverse edge 2331 extends away from the corresponding middle section 23A, and the lower transverse edge 2332 extends toward an interior of the corresponding middle section 23A. By using the structure of bent edges of the side plate, the transverse widths of the sections of the chord assemblies can be further reduced, the number of components of the sections can be reduced, and the structure can be simplified.

An escalator updating method of use of the embedded type updating escalator is provided according to the present application, where the method is used to update the escalator while the original truss of the original escalator is reserved, and the method includes:

(A) removing other components of the original escalator except the original truss to reserve a complete structure of the original truss including the transverse bar members;

(B) embedding the multiple sections of the truss assembly into the original truss to avoid the transverse bar members during embedding, and connecting and fixing the truss assembly with the original truss; and (C) mounting the stairs, the stair guide rails, the stair chains, the traction machine, the skirt plates, the inner and outer cover plates, the handrail system, and the electrical control system in combination with the truss assembly.

According to the above description of the disclosed embodiments, those skilled in the art may implement or practice the present application. Many modifications to these embodiments are apparent for those skilled in the art. The general principles defined herein may be applied to other embodiments without departing from the spirit or scope of the present application. Therefore, the present application should not be limited to the embodiments disclosed herein, but has the widest scope in accordance to the principle and the novel features disclosed herein.

The invention claimed is:

1. An embedded type updating escalator, mounted in combination with an original truss of an original escalator, wherein the embedded type updating escalator comprises a truss assembly, stairs, stair guide rails, stair chains, a traction machine, skirt plates, inner and outer cover plates, a handrail system, and an electrical control system, wherein the stairs, the stair guide rails, the stair chains, the traction machine, the skirt plates, the inner and outer cover plates, the handrail system, and the electrical control system are mounted in combination with the truss assembly; the truss assembly comprises a plurality of sections, a transverse width of each section is smaller than an inner transverse width of the original truss, and the plurality of sections are embedded into the original truss; the original truss is provided with a plurality of transverse bar members, and the sections are embedded into the original truss to avoid the transverse bar members, wherein each section comprises two upper chord members and two lower chord members, wherein the upper and lower chord members each have an angle steel structure, the two upper chord members are fixed to two sides of an upper portion of the corresponding section respectively, the two lower chord members are fixed to two sides of a lower portion of the corresponding section respectively; a transverse edge of each upper chord member extends away from the corresponding section, and a transverse edge of each lower chord member extends toward an interior of the corresponding section.

2. The embedded type updating escalator according to claim 1, wherein the original truss comprises a lower portion, a middle portion and an upper portion, wherein the lower portion and the upper portion are parallel and horizontal, the middle portion is obliquely located between the lower portion and the upper portion, a bent turning section is provided at a junction between the middle portion and the lower portion, and another bent turning section is provided at a junction between the middle portion and the upper portion.

3. The embedded type updating escalator according to claim 2, wherein the plurality of sections comprises a lower machine room, a lower turning section, a plurality of middle sections, an upper turning section and an upper machine room, wherein the lower machine room is embedded into the lower portion, the lower turning section is embedded into the bent turning section at the junction between the lower portion and the middle portion, the plurality of middle sections are embedded into the middle portion, the upper turning section is embedded into the bent turning section at the junction between the middle portion and the upper portion, and the upper machine room is embedded into the upper portion.

4. An escalator updating method of use of the embedded type updating escalator according to claim 2, comprising:

(A) removing other components of the original escalator except the original truss to reserve a complete structure of the original truss including the transverse bar members;

(B) embedding the plurality of sections of the truss assembly into the original truss to avoid the transverse bar members during embedding, and connecting and fixing the truss assembly with the original truss; and (C) mounting the stairs, the stair guide rails, the stair chains, the traction machine, the skirt plates, the inner and outer cover plates, the handrail system, and the electrical control system in combination with the truss assembly.

5. An escalator updating method of use of the embedded type updating escalator according to claim 3, comprising:
 (A) removing other components of the original escalator except the original truss to reserve a complete structure of the original truss including the transverse bar members;
 (B) embedding the plurality of sections of the truss assembly into the original truss to avoid the transverse bar members during embedding, and connecting and fixing the truss assembly with the original truss; and
 (C) mounting the stairs, the stair guide rails, the stair chains, the traction machine, the skirt plates, the inner and outer cover plates, the handrail system, and the electrical control system in combination with the truss assembly.

6. The embedded type updating escalator according to claim 1, wherein each section comprises two side plates which are located on two sides of the corresponding section respectively, wherein each side plate is bent to form an upper transverse edge and a lower transverse edge, the upper transverse edge extends away from the corresponding section, and the lower transverse edge extends toward an interior of the corresponding section.

7. An escalator updating method of use of the embedded type updating escalator according to claim 5, comprising:
 (A) removing other components of the original escalator except the original truss to reserve a complete structure of the original truss including the transverse bar members;
 (B) embedding the plurality of sections of the truss assembly into the original truss to avoid the transverse bar members during embedding, and connecting and fixing the truss assembly with the original truss; and
 (C) mounting the stairs, the stair guide rails, the stair chains, the traction machine, the skirt plates, the inner and outer cover plates, the handrail system, and the electrical control system in combination with the truss assembly.

8. An escalator updating method of use of the embedded type updating escalator according to claim 1, comprising:
 (A) removing other components of the original escalator except the original truss to reserve a complete structure of the original truss including the transverse bar members;
 (B) embedding the plurality of sections of the truss assembly into the original truss to avoid the transverse bar members during embedding, and connecting and fixing the truss assembly with the original truss; and
 (C) mounting the stairs, the stair guide rails, the stair chains, the traction machine, the skirt plates, the inner and outer cover plates, the handrail system, and the electrical control system in combination with the truss assembly.

* * * * *